Feb. 16, 1937.  H. R. PERRY ET AL  2,070,917
CONVEYER SYSTEM
Original Filed Oct. 30, 1933  2 Sheets-Sheet 2
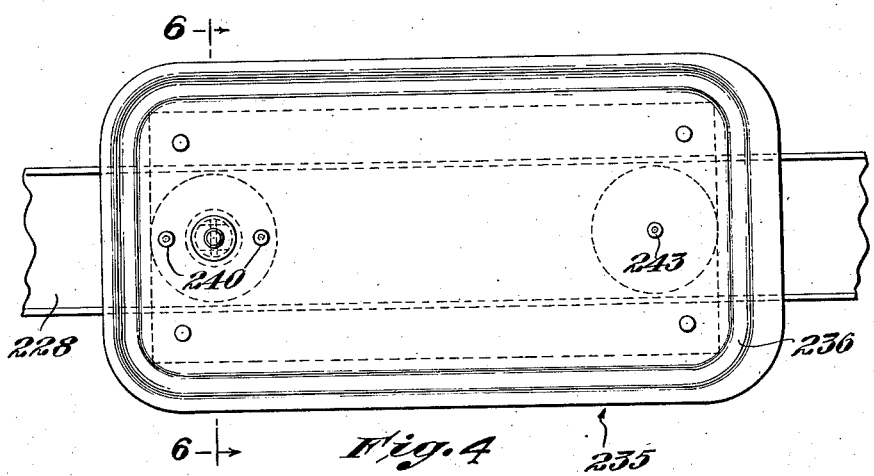
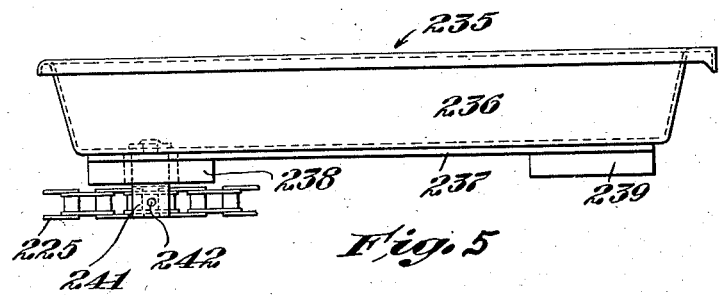
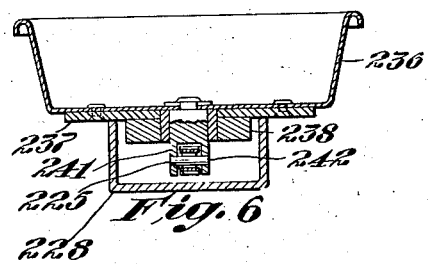

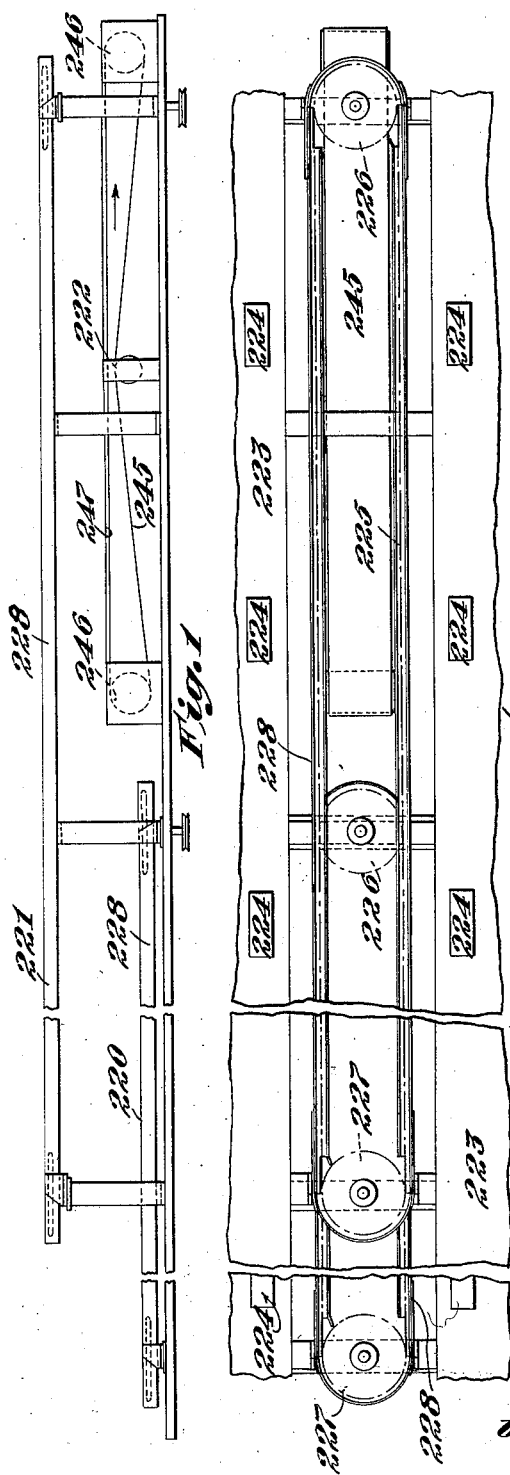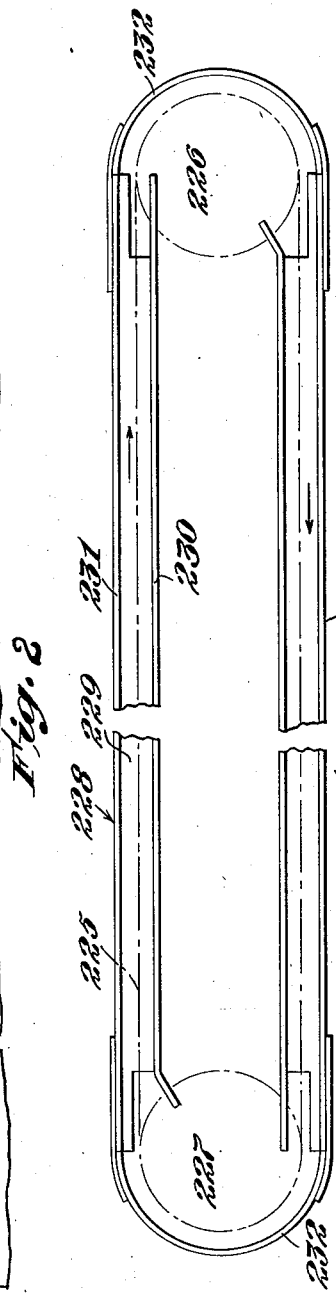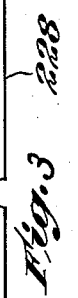

Patented Feb. 16, 1937

2,070,917

UNITED STATES PATENT OFFICE 2,070,917

CONVEYER SYSTEM

Harold R. Perry, Swarthmore, Pa., and Chester S. Jennings, Syracuse, N. Y., assignors to The Lamson Company, Syracuse, N. Y., a corporation of Massachusetts Original application October 30, 1933, Serial No. 695,856. Divided and this application October 10, 1935, Serial No. 44,396

3 Claims. (Cl. 198—181)

This invention relates to an improvement in a conveyer system and the present application is a division of our copending application Serial No. 695,856, filed October 30, 1933.

It has for its primary object the provision of a system comprising a plurality of conveyers by which work is transported to a plurality of operators for treatment thereby and is thereafter transported from such operators to a predetermined destination.

A further object of this invention is the provision of cars for the work secured to chains and guided in their travel by troughs.

Other objects will appear from a consideration of the following description and of the accompanying drawings which form a part thereof and in which Fig. 1 is a side elevation of an installation embodying this invention;

Fig. 2 is a plan view thereof;

Fig. 3 is a plan view on an enlarged scale of one conveyer of such system;

Fig. 4 is a side elevation of a typical car adapted for use therein;

Fig. 5 is a plan view of such car when installed in the system; and

Fig. 6 is a cross-sectional view taken along the line 6—6 of Fig. 5.

The drawings show an installation embodying this invention and comprising a primary conveyer 220, a secondary conveyer 221, a tertiary conveyer 222 and a table 223 along both sides of which are located work benches 224. The conveyers 220 and 221 each comprise an endless chain 225 which travels in a horizontal plane about a head sprocket 226 and a foot sprocket 227. The chains travel between the sprockets in troughs 228 having bases 229, inner walls 230 and outer walls 231. The outer walls 231 are connected at each end by extensions 232 which extend around the sprockets. The lower portions of the inner walls 230 and the bases of each trough, are cut away at the ends thereof to avoid interference with the sprockets and the inner wall 230 at one end of each trough is bent inwardly toward the axis of the adjacent sprocket. The troughs and extensions thus define annular tracks around which the cars travel (see Fig. 3) and the upper edges of the walls and extensions serve as rails on which the cars are supported.

Fixed to the chains 225 at regularly spaced intervals are cars 235. Each car comprises a work-carrying body, here shown in the form of a pan 236. Secured to the under side of the pan 236 is a plate 237 and two disks 238 and 239, said plate and disks being preferably of fibre or similar material. The plate 237 covers substantially the entire bottom of the pan, and the disks are arranged along the longitudinal center of the pan adjacent the ends thereof. The disk 238 is rigidly fixed by rivets or other means 240 to the pan and in a central opening in the disk is located a clip 241 in the form of an inverted U. The clip is pivotally secured through its base to the pan and the central opening is of such diameter to permit the free turning of the clip. The lower ends of the clip are joined to the chain 225 by any suitable means, a pin 242 being here employed for that purpose. The disk 239 is secured to the pan by a rivet or similar means 243 through the center thereof and preferably is held against rotation thereby. The disks 238 and 239 are of such diameter that they freely enter the trough between the walls thereof while the plate 237 rests upon the rails formed by the upper edges of the walls (see Fig. 6) and the extensions 232. The chain 225 of each conveyer travels in a clockwise direction, as indicated by the arrows in Fig. 3 and the inturned ends of the inner walls act to insure the entry of the disks into the troughs after they have been carried around the sprockets.

The tertiary conveyer 222 travels in a vertical plane and comprises a conveyer belt 245 passed over pulleys 246 and so driven through a trough 247 that the upper run advances to the right in Fig. 1 as indicated by the arrow thereon.

The illustrated and described installation is particularly adapted for the transportation of shoe uppers or other work in the stitching room of a shoe factory. The operator at the station 224 shown in the upper left hand corner of Fig. 2 places the uppers or other parts in a car 235 of the primary conveyer 220 by which they are carried by the conveyer past other stations 224 for example the second from the left in the upper row or the station directly opposite in the lower row. The contents of the car are removed by an operator at one of these stations and thereafter placed in a car 235 of the secondary conveyer 221 which travels past the other stations 224. The articles are removed from this car by other operators and then placed in the same or any other car of the conveyer 221 until the work thereon has been completed. The operator finishing the work drops it onto the belt 245 of the tertiary conveyer 222 by which it is carried to a container or receptacle not shown.

While one embodiment of this invention and its particular use have been described in detail it will be understood that we are not limited thereto and that other embodiments and uses may be made without departing from the spirit and scope of the invention as set forth in the following claims.

We claim:

1. A conveyer comprising an endless chain traveling in a horizontal plane, a track defined by a trough in which the chain travels and a plurality of cars attached to said chain, each said car including a work-carrying body and two disks on the under side of the car body, one adjacent each end thereof, the car body riding on the walls of the trough and the disks riding in the trough whereby the cars are guided over said track.

2. A conveyer comprising an endless chain traveling in a horizontal plane, a track defined by a trough in which the chain travels and a plurality of cars attached to said chain each said car including a work-carrying body and two disks on the under side of the car body, one adjacent each end thereof, rivets by which the disks are secured in place, a U-shaped clip located in the rivet of one disk and secured to the chain, the car body riding on the walls of the trough and the disks riding in the trough whereby the cars are guided over said track.

3. A conveyer comprising an endless chain traveling in a horizontal plane, end sprockets over which the chain passes, a closed track defined by parallel troughs through which the chain travels, the outer walls of which are connected at the ends by extensions around the sprockets, a plurality of cars attached to said chain and provided at the under side with disks, the disks riding in said troughs and against said extensions, and the cars resting on the trough walls and extensions during their travel.

HAROLD R. PERRY.
CHESTER S. JENNINGS.